United States Patent
Blackford et al.

(10) Patent No.: US 12,314,921 B2
(45) Date of Patent: May 27, 2025

(54) METHOD OF OPERATING AN AUTOMATED TRANSACTION MACHINE FOR ENHANCED SECURITY

(71) Applicant: Diebold Nixdorf, Incorporated, North Canton, OH (US)

(72) Inventors: Damon J. Blackford, Akron, OH (US); Ricardo Barros, Macedonia, OH (US); Chris Rowe, Copley, OH (US)

(73) Assignee: DIEBOLD NIXDORF, INCORPORATED, North Canton, OH (US)

( * ) Notice: Subject to any disclaimer, the term of this patent is extended or adjusted under 35 U.S.C. 154(b) by 832 days.

(21) Appl. No.: 17/054,694

(22) PCT Filed: May 8, 2019

(86) PCT No.: PCT/US2019/031293
§ 371 (c)(1),
(2) Date: Nov. 11, 2020

(87) PCT Pub. No.: WO2019/217538
PCT Pub. Date: Nov. 14, 2019

(65) Prior Publication Data
US 2021/0081917 A1    Mar. 18, 2021

Related U.S. Application Data

(60) Provisional application No. 62/785,933, filed on Dec. 28, 2018, provisional application No. 62/690,503, (Continued)

(51) Int. Cl.
*G06Q 20/20* (2012.01)
*G06F 21/86* (2013.01)
(Continued)

(52) U.S. Cl.
CPC ........... *G06Q 20/203* (2013.01); *G06F 21/86* (2013.01); *G06Q 10/20* (2013.01);
(Continued)

(58) Field of Classification Search
CPC .... G07F 19/203; G07F 19/206; G07F 19/209; G06Q 20/4016; G06Q 20/382; G06Q 20/223
(Continued)

(56) References Cited

U.S. PATENT DOCUMENTS 3,958,583 A * 5/1976 Shigemori .............. G06M 7/06
                                                         194/207
5,386,104 A    1/1995 Sime
(Continued)

FOREIGN PATENT DOCUMENTS

| EP | 3267582 A1 | 1/2018 | |
|---|---|---|---|
| JP | 2017201557 A * | 11/2017 | |
| WO | WO-2019130620 A1 * | 7/2019 | .............. G07D 1/00 |

OTHER PUBLICATIONS

International Preliminary Report on Patentability and Written Opinion of the International Searching Authority dated Nov. 17, 2020 filed in the corresponding PCT Application; 6 pages.

*Primary Examiner* — Luna Champagne
(74) *Attorney, Agent, or Firm* — Black McCuskey

(57) ABSTRACT

A method performed by an automated transaction machine (ATM) can include maintaining, with the ATM, a count of disbursement commands received by the ATM that require the ATM to dispense a stack size of currency greater than or equal to a first predetermined amount. The method can also include comparing, with the ATM, the count to a second predetermined amount. The method can also include aborting, by the ATM, a first disbursement command that requires a stack size of currency to be dispensed by the ATM that is greater than or equal to the first predetermined amount in (Continued)

response to said comparing when the count is greater than or equal to the second predetermined amount.

5 Claims, 3 Drawing Sheets

Related U.S. Application Data filed on Jun. 27, 2018, provisional application No. 62/670,420, filed on May 11, 2018.

(51) Int. Cl.
*G06Q 10/20* (2023.01)
*G06Q 20/10* (2012.01)
*G07D 11/225* (2019.01)
*G07D 11/26* (2019.01)
*G07D 11/28* (2019.01)
*G07F 19/00* (2006.01)

(52) U.S. Cl.
CPC ....... *G06Q 20/1085* (2013.01); *G07D 11/225* (2019.01); *G07D 11/26* (2019.01); *G07D 11/28* (2019.01); *G07F 19/203* (2013.01); *G07F 19/206* (2013.01); *G07F 19/209* (2013.01); *G07D 2211/00* (2013.01)

(58) Field of Classification Search
USPC .......................................................... 705/22
See application file for complete search history.

(56) References Cited

U.S. PATENT DOCUMENTS

| | | |
|---|---|---|
| 6,508,397 B1 | 1/2003 | Do |
| 7,340,415 B1* | 3/2008 | Gasper .............. G06Q 20/1085 |
| | | 705/43 |
| 2004/0133495 A1* | 7/2004 | Bosch .................... G07D 11/20 |
| | | 705/35 |
| 2005/0056693 A1* | 3/2005 | Yokoi .................. G07F 19/202 |
| | | 235/379 |
| 2006/0169764 A1 | 8/2006 | Ross |
| 2007/0016795 A1* | 1/2007 | Asano .................... G07F 19/20 |
| | | 713/168 |
| 2008/0195540 A1 | 8/2008 | Gee |
| 2014/0351125 A1* | 11/2014 | Miller ................... G06Q 40/02 |
| | | 235/379 |
| 2015/0278818 A1* | 10/2015 | Horgan ............. G06Q 20/4016 |
| | | 705/43 |
| 2016/0140524 A1 | 5/2016 | Crist |
| 2017/0365134 A1 | 12/2017 | Kurian |
| 2020/0066110 A1* | 2/2020 | Nelson ................. G07F 19/205 |

\* cited by examiner

METHOD OF OPERATING AN AUTOMATED TRANSACTION MACHINE FOR ENHANCED SECURITY

CROSS-REFERENCE TO RELATED APPLICATIONS

This application is a national phase application of PCT/US2019/031293, for a METHOD OF OPERATING AN AUTOMATED TRANSACTION MACHINE FOR ENHANCED SECURITY, filed on May 8, 2019, which claims the benefit of United States Provisional Patent Application Ser. No. 62/785,933 for a METHOD OF OPERATING AN AUTOMATED TRANSACTION MACHINE FOR ENHANCED SECURITY, filed on Dec. 28, 2018, which is hereby incorporated by reference in its entirety. This application also claims the benefit of U.S. Provisional Patent Application Ser. No. 62/690,503 for a METHOD OF OPERATING AN AUTOMATED TRANSACTION MACHINE FOR ENHANCED SECURITY, filed on Jun. 27, 2018, which is hereby incorporated by reference in its entirety. This application also claims the benefit of U.S. Provisional Patent Application Ser. No. 62/670,420 for an AUTOMATED TRANSACTION MACHINE WITH OPERATIONAL THRESHOLDS, filed on May 11, 2018, which is hereby incorporated by reference in its entirety.

BACKGROUND

1. Field

This relates in general to a method of operating an automated transaction machine (ATM) for enhanced security.

2. Description of Related Prior Art

U.S. Pub. No. 20190108734 discloses a TAMPERING DETECTION SYSTEM FOR FINANCIAL KIOSKS. The system may include components configured to monitor for criteria indicating tampering with a kiosk. The kiosk may include a safe, a computer disposed external to the safe, and a cash dispensing device disposed at least partially within the safe and selectively coupled to the external computer by an electronic communication path. Using processing logic disposed in the safe, a switch disposed in the electronic communication path may be caused to open in response to detection of one or more of the tampering criteria, thereby automatically severing the communication path.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method performed by an automated transaction machine (ATM) can include maintaining, with the ATM, a count of disbursement commands received by the ATM that require the ATM to dispense a stack size of currency greater than or equal to a first predetermined amount. The method can also include comparing, with the ATM, the count to a second predetermined amount. The method can also include aborting, by the ATM, a first disbursement command that requires a stack size of currency to be dispensed by the ATM that is greater than or equal to the first predetermined amount in response to said comparing when the count is greater than or equal to the second predetermined amount.

According to other features, the method can also include receiving a second disbursement command requiring a stack size less than the first predetermined amount. The method can also include decrementing the count in response to the receiving the second disbursement command.

In other features, the method can also include displaying, on a display of the ATM, a message indicating that the ATM is out of banknotes, regardless of an actual quantity of banknotes held by the ATM after the aborting, the displaying in response to the aborting. The method can also include ceasing operations of the ATM after the aborting, the ceasing in response to the aborting. The method can also include decreasing a speed of moving banknotes out of the ATM during disbursement commands received after the first disbursement command, the decreasing in response to the aborting. The method can also include transmitting, with a transceiver of the ATM, a message to a remote computing device that the ATM requires maintenance service, the transmitting in response to the aborting. The method can also include limiting every disbursement after the first disbursement command to a third predetermined amount that is less that the first predetermined amount, the limiting in response to the aborting.

According to additional features, the method can also include establishing a delay timer in response to the aborting, the time period of the delay timer starting when a disbursement command is received and ending after a predetermined time period. The method can also include running the delay timer for the entire predetermined time period before disbursing banknotes in response to disbursement commands received after the first disbursement command.

According to other features, the method can also include changing at least one of the first predetermined amount and the second predetermined amount only by commands received by the ATM from a remote computing device. The method can also include changing at least one of the first predetermined amount and the second predetermined amount based on the calendar date.

In other features, the method can also include receiving, at a primary controller of the ATM, a transaction request from a user of the ATM. The method can also include transmitting, with a transceiver of the ATM, over a first network, details of the transaction request to a first server computing device that is remote from the ATM for approval of the transaction request. The method can also include receiving, at the primary controller of the ATM, approval of the transaction request from the first server computing device. The method can also include directing, from the primary controller of the ATM, in response to the receiving approval of the transaction request, a second disbursement command to an advanced function dispenser (AFD) of the ATM. The AFD and the primary controller can be distinct and physically spaced components of the ATM. The method can also include dispensing, with the AFD of the ATM, banknotes in response to the second disbursement command. The method can also include receiving, at the AFD of the ATM, the first disbursement command.

According to additional features, the maintaining can be further defined as maintaining, with the AFD, the count of disbursement commands requiring a stack size greater than or equal to the first predetermined amount. The comparing can be further defined as comparing, with the AFD of the ATM, the count to a second predetermined amount. The aborting can be further defined as aborting, with the AFD of the ATM, the first disbursement command requiring the stack size greater than or equal to the first predetermined amount in response to the comparing when the count is greater than or equal to the second predetermined amount. The aborting can be further defined as aborting, with the AFD of the ATM, without regard to commands received from outside of the AFD of the ATM, the first disbursement command requiring the stack size greater than or equal to the first predetermined amount in response to the comparing when the count is greater than or equal to the second predetermined amount.

According to other features, the method can also include transmitting, with the AFD of the ATM, over a second network, a first alarm to a second server computing device that is remote from the ATM, the transmitting in response to the aborting. The maintaining can be further defined as maintaining, with an alarm card of the AFD, the count of disbursement commands requiring a stack size greater than or equal to the first predetermined amount. The comparing can be further defined as comparing, with the alarm card of the AFD of the ATM, the count to a second predetermined amount. The transmitting can be further defined as transmitting, with the alarm card of the AFD of the ATM, over the second network, the first alarm to the second server computing device.

In other features, the method can also include sensing temperature with a temperature sensor positioned in the ATM. The method can also include communicating, with the temperature sensor, temperature data to the alarm card. The method can also include transmitting, with the AFD of the ATM, over the second network, a second alarm to the second server computing device in response to the temperature data.

According to additional features, the method can also include sensing movement of a door of the ATM with a second sensor positioned in the ATM. The method can also include communicating, with the second sensor, movement data to the alarm card. The method can also include transmitting, with the AFD of the ATM, over the second network, a third alarm to the second server computing device in response to the movement data.

According to other features, the method can also include sensing motion with a motion sensor positioned in the ATM. The method can also include communicating, with the motion sensor, motion data to the alarm card. The method can also include transmitting, with the AFD of the ATM, over the second network, a fourth alarm to the second server computing device in response to the motion data.

DETAILED DESCRIPTION

The present disclosure is desirable to enhance the security of ATMs. ATMs are used by bank account holders to withdraw currency or bank notes, or to make deposits of such notes. Often, in order to initiate an exchange at the ATM, the user must be authenticated. This process can include the user presenting a token in the form of a bank card and entering a personal identification number (PIN). When this information is confirmed, the user is authenticated and the ATM can dispense banknotes to the user. ATMs are often the target of fraudulent activity, especially when positioned at relatively isolated locations.

Figure 1:
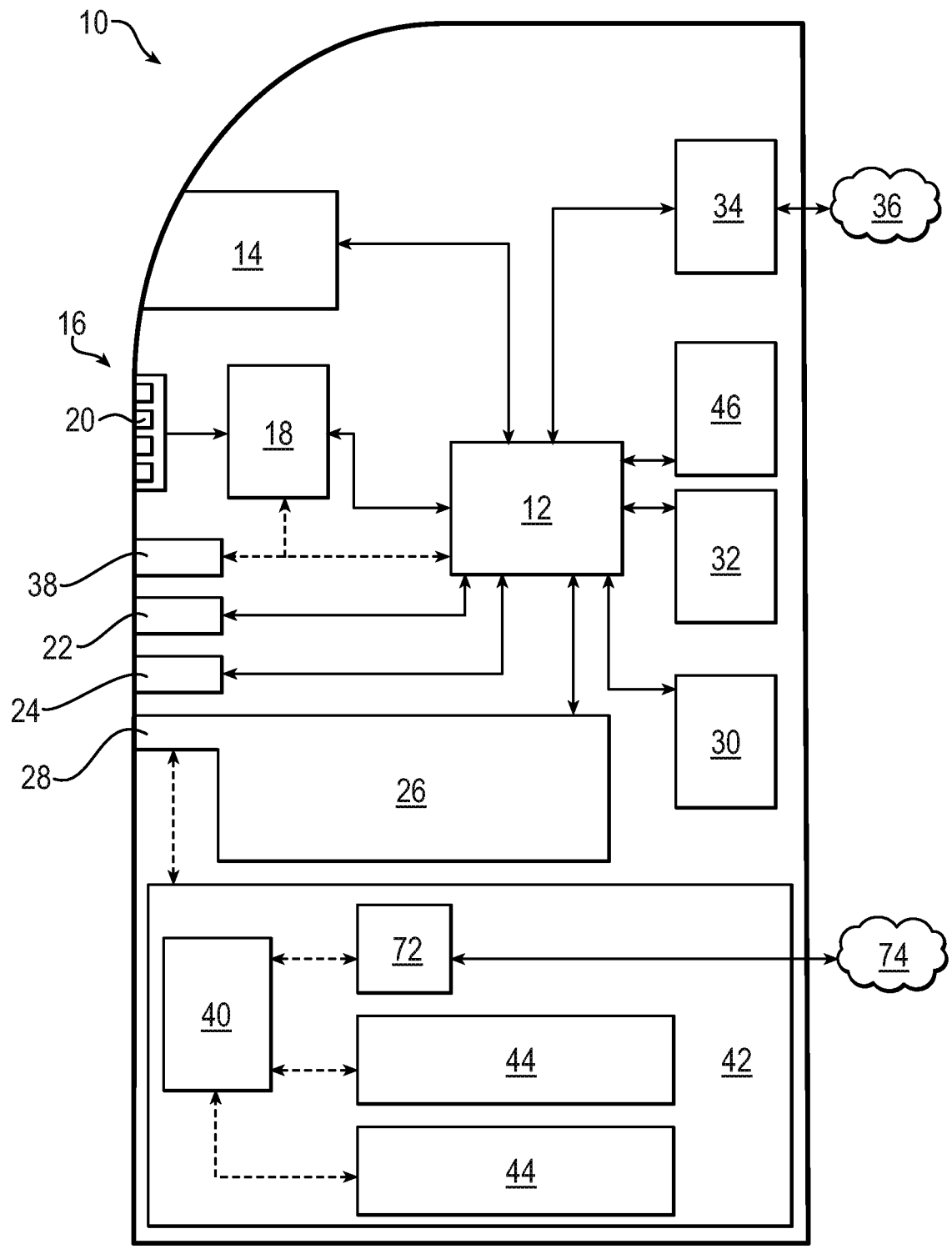
FIG. 1 is a functional block diagram of an exemplary ATM according to one or more implementations of the present disclosure.

Referring now to the drawings, FIG. 1 discloses a functional block diagram of an exemplary ATM 10 according to one or more implementations of the present disclosure. It will be understood that embodiments of the present disclosure are applicable to other types of SSTs, such as vending machines and kiosks, by way of example and not limitation. The ATM 10 includes different structures and subsystems for executing and recording transactions. The ATM 10 includes a computing device 12. The computing device 12 is also referred to as the PC of the ATM 10 in the art. The computing device 12 is the primary controller of the operations of the ATM 10. The exemplary computing device 12 has one or more processors and a non-transitory, computer readable medium 46. The computing device 12 operates under the control of an operating system, kernel and/or firmware and executes or otherwise relies upon various computer software applications, components, programs, objects, modules, data structures, etc. The exemplary computing device 12 can operate under the control of the Windows® operating system. The computer readable medium (memory) 46 of the computing device 12 can include random access memory (RAM) devices comprising the main storage of computing device 12, as well as any supplemental levels of memory, e.g., cache memories, non-volatile or backup memories (e.g., programmable or flash memories), read-only memories, etc. In addition, memory may be considered to include memory storage physically located elsewhere in computing device 12, such as any cache memory in a processor, as well as any storage capacity used as a virtual memory. The computing device 12 can also include one or more mass storage devices, e.g., a floppy or other removable disk drive, a hard disk drive, a direct access storage device (DASD), an optical drive (e.g., a CD drive, a DVD drive, etc.), and/or a tape drive, among others for memory 46.

The exemplary ATM 10 also includes a display 14. The computing device 12 can control the display 14 to present information to the user for furthering completion of the transaction. The display 14 can be a touch screen that allows the user to enter information through the display 14. The exemplary display 14 is configured to transmit any user-entered information to the computing device 12.

The exemplary ATM 10 also includes a key pad 16 and an encryption module 18. Generally, the combination of a key pad and an encryption module are referred to in the art as an encrypted pin pad (EPP). The exemplary key pad 16 includes a plurality of keys, such as key 20. The exemplary encryption module 18 has one or more processors and a non-transitory, computer readable medium. The user can press the keys of the key pad 16 to enter a pin. The key pad is placed in communication with the encryption module 18 and therefore the numbers of the pin are received by the encryption module 18. It is noted that the communication of the pin is direct and secure; the pin cannot be intercepted between the key pad 16 and the encryption module 18. The pin is then encrypted by the encryption module to define a pin block. The encryption module 18 includes a network encryption key and applies the network encryption key to encrypt the pin to a pin block. The exemplary encryption module 18 is configured to transmit the pin block to the computing device 12.

The exemplary ATM 10 also includes a card module 22. The card module 22 can receive a token from the user, such as a card. The card module 22 can be configured to execute read and write operations with respect to any storage medium fixed to the user's card. The exemplary card module 22 is configured to transmit any data read from the user's card to the computing device 12. The exemplary card module 22 can also be configured to receive commands and data from the computing device 12 and change data stored on the user's card.

The exemplary ATM 10 also includes a printer module 24. The computing device 12 can control the printer module 24 to print a receipt when a transaction has been completed. The printer module 24 can communicate one or more messages to the computing device 12, such as a maintenance message regarding the need to refill printer paper.

The exemplary ATM 10 also includes an article exchange unit 26. In the exemplary embodiment, the article exchange unit 26 is configured to receive items such as bank notes (cash) and checks. The exemplary article exchange unit 26 includes a slot 28 defined on an exterior of the ATM 10 for the passage of such items. In other embodiments of the present disclosure, an article exchange unit can be configured to facilitate the exchange of other items. The article exchange unit 26 can include one or more sensors and transmit signals from any such sensors to the computing device 12 to execute an exchange. The computing device 12 can control the article exchange unit 26 in response to such signals. For example, the article exchange unit 26 can include a sensor that detects receipt of an item such as a check. The article exchange unit 26 can include a further sensor in the form of a scanner that generates an image of the received item and transmits the image to the computing device 12.

The exemplary ATM 10 also includes a printer module 30. The printer module 30 can generate a continuous record of all transactions executed by the ATM 10. The computing device 12 can control the printer module 30 to supplement the record after each transaction has been completed. The printer module 30 can communicate one or more messages to the computing device 12, such as a maintenance message regarding the need to refill printer paper.

The exemplary ATM 10 also includes an access module 32. The access module 32 can be positioned proximate to a rear side of the ATM 10. The access module 32 can be utilized for service and support technicians. For example, the access module 32 can be utilized by a field engineer to complete software updates to the computing device 12. The access module 32 can also be utilized when non-software updates and maintenance is performed, such as the refilling of printer paper or currency.

The exemplary ATM 10 also includes a transceiver 34. The exemplary transceiver 34 is configured to facilitate communication between the computing device 12 and other computing devices that are distinct from and physically remote from the computing device 12. An example of such a remote computing device is a server computing device, such as a banking server communicating with a plurality of ATMs. The exemplary transceiver 34 places the computing device 12 in communication with one or more networks, such as network 36. The network 36 can be a local area network (LAN), a wide area network (WAN) such as the Internet, or any combination thereof. The transceiver 34 can transmit data and requests for input generated by the computing device 12 and receive responses to these requests, directing these responses to the computing device 12.

For example, the computing device 12 can receive a transaction request from a user through the card module 22, the display 14, and/or the key pad 16. The computing device 12 can then transmit details of the transaction request (data) to a first server computing device that is remote from the ATM for approval of the transaction request. The computing device 12 can transmit the data through the transceiver 34 over a network at least partially dedicated to the transmission of financial transactions. Such a network will have enhanced security protocols relative to networks that do not direct the flow of financial transactions.

The exemplary ATM 10 also includes a transceiver 38. The exemplary transceiver 38 is configured to facilitate communication between at least one of the encryption module 18 and the computing device 12 and other computing devices that are distinct from and physically proximate to the ATM 10. An example of such a proximate computing device is a smartphone possessed by the user. The dashed connection lines in FIG. 1 represent optional interconnections. The exemplary transceiver 38 can place the user's smartphone in communication with the encryption module 18, the computing device 12, or both. The exemplary transceiver 38 can implement various communication protocols. For example, the transceiver 38 can be a Near Field Communication (NFC) device. Alternatively, the transceiver 38 can be a Bluetooth beacon. The transceiver 38 can transmit and receive data and requests for input generated by the encryption module 18 and/or the computing device 12, such transmissions occurring with the user's smart phone for example. The exemplary computing device 12 is thus configured to communicate with other computing devices.

The exemplary ATM 10 also includes an AFD 40. The AFD 40 can dispense banknotes, such as currency. The exemplary AFD 40 is positioned in a safe 42. One or more cassettes or cash boxes 44 are also positioned and protected in the safe 42. Banknotes are stored in the cassettes 44 for disbursement to a user of the ATM 10. The exemplary AFD 40 can extract the banknotes from one or more of the cassettes 44 and direct them out of the ATM 10 through the slot 28. The exemplary AFD 40 can communicate with and generally be controlled by the computing device 12. As set forth below, the AFD 40 can be configured to independently assess and execute dispense (or disbursement) commands.

Each of the cassettes 44 can engage the AFD 40 through a rack whereby the positioning of the cassettes is controlled. Further, the each of the cassettes 44 and the AFD 40 can include mating connectors of any form, whereby a positive interconnection is confirmed electronically. When one or more of the cassettes 44 and the AFD 40 are not properly interconnected, a signal or lack thereof can be communicated to the computing device 12 whereby an error message is generated or the ATM 10 can be disabled.

Figure 2:
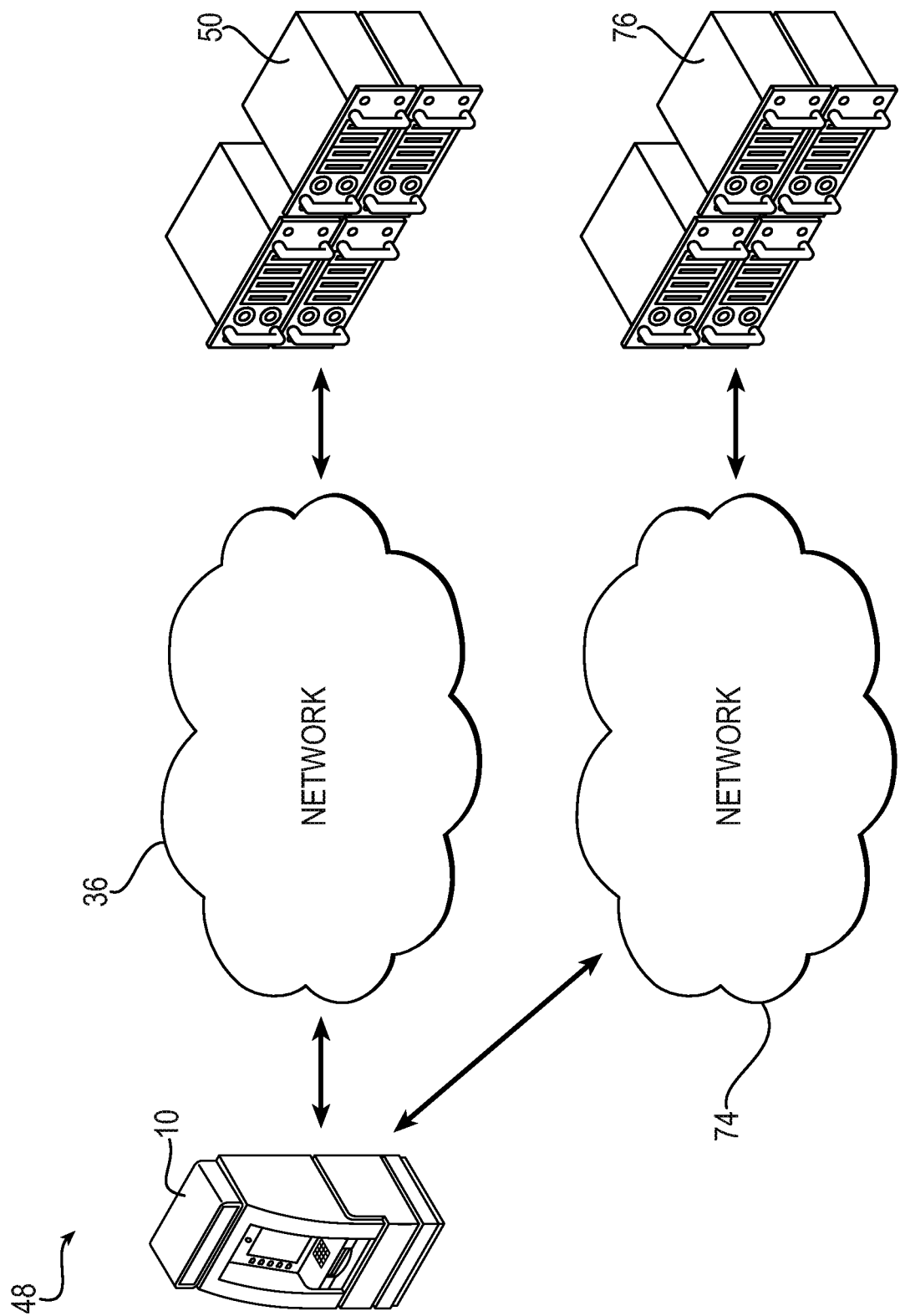
FIG. 2 is a functional block diagram of an exemplary system according to one or more implementations of the present disclosure.

FIG. 2 is a functional block diagram of an exemplary system 48 according to one or more implementations of the present disclosure. The exemplary system 48 includes the ATM 10. The exemplary system 10 also includes a computing device 50, which is a server computing device in the exemplary embodiment of the present disclosure. The exemplary computing device 50 has one or more processors and a non-transitory, computer readable medium. The system 10 can be operated by a financial institution and the user can be an account holder of the financial institution. Other implementations of the present disclosure, by way of example and not limitation, can be a system can be operated by a merchant of consumer goods, a provider of healthcare-related products, or a delivery company.

The ATM 10 and the computing device 50 can communicate over the network 36. Transmissions over the network 36 may be encrypted and may include Message Authentication Codes (MACs) to enhance security. MACs are appended to messages sent from and received by a device such as the ATM 10. MACs verify that the messages sent and the messages received are identical and also confirm that messages originate from an approved source. The computing devices 12 and 50 can also apply Transport Layer Security (TLS) or Secure Sockets Layer (SSL) protocols and include respective firewalls to enhance security.

The computing device 12 can receive approval of transaction requests from the server computing device 50 and direct corresponding disbursement commands to the AFD 40. The AFD 40 can thus communicate with and be at least partially controlled by the computing device 12. The exemplary AFD 40 and the exemplary computing device 12 are distinct and physically spaced components of the ATM 10. Each has one or more processors and memory to store data and command logic. Generally, in response to receiving a disbursement command, the AFD 40 can retrieve a particular number of bank notes (a "stack size") from the cassettes 44 and direct the banknotes to the user through the dispensing slot 28. The exemplary AFD 40 includes one or more processors and memory and is configured to apply logic to commands received from the computing device 12 to inhibit fraudulent activity. An exemplary framework for applying logic to commands received from the computing device 12 is set forth below.

Figure 3:
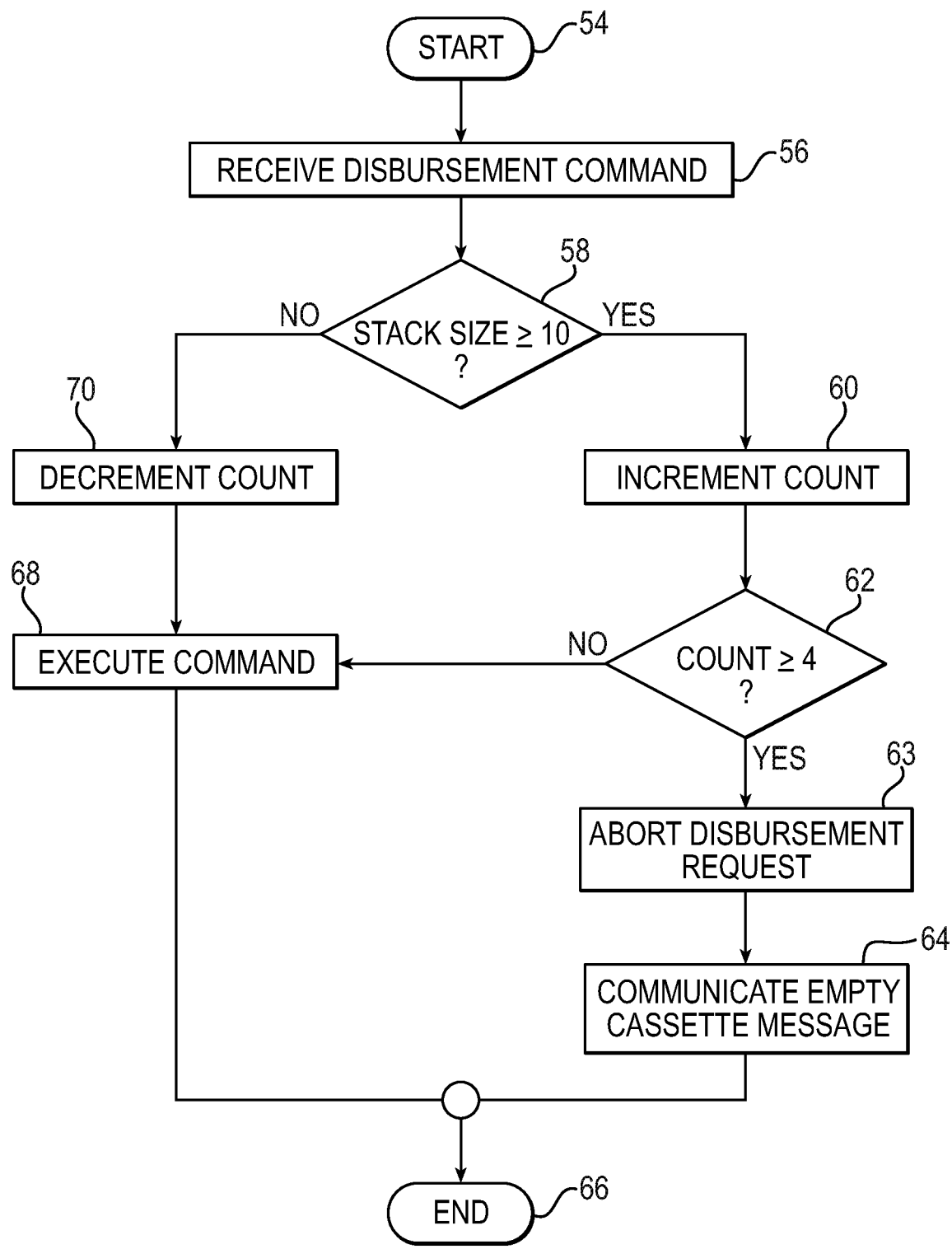
FIG. 3 is a flow diagram of an exemplary method of operating an ATM according to one or more implementations of the present disclosure.

FIG. 3 is a flow diagram of an exemplary method of operating an ATM, and more particularly the AFD 40 of an ATM, according to one or more implementations of the present disclosure. The method is associated, at least in part, with inhibiting fraud. At 54, the method starts. At 56, the AFD 40 receives a command from the computing device 12 to disburse banknotes to a user. At this point in the operation of the ATM 10, the user has been authenticated for a requested disbursement of banknotes or, alternatively, perpetrators of fraudulent activity have somehow come to exercise sufficient control over the ATM 10 to direct the disbursement command to the AFD 40.

The command will indicate a particular amount to disburse and the amount will correspond to a number of banknotes to disburse (the stack size). At 58, the AFD 40 compares the stack size necessary to execute the command against a first predetermined value. In the exemplary embodiment, the first predetermined value is ten. The first predetermined value could be different in other embodiments of the present disclosure.

If, at 58, the stack size is greater than or equal to the first predetermined value, the AFD 40 increments a variable value, a "count," at 60. The exemplary AFD 40 thus maintains a count of disbursement commands requiring a stack size greater than or equal to the first predetermined amount. In the exemplary embodiment, the count is the number of successive commands associated with a stack size greater than or equal to the first predetermined amount.

After incrementing the count at 60, the AFD 40 compares the count against a second predetermined value at 62. In the exemplary embodiment, the second predetermined value is four. If, at 62, the count is less than the second predetermined value, the AFD 40 executes the command at 68 and then the process ends at 66. Conversely, if, at 62, the count is greater than or equal to four, the AFD 40 aborts the disbursement command at 63. In other words, the AFD 40 does not execute the disbursement command. The computing device 12 can direct the display 14 to advise the user that the requested disbursement of banknotes will not occur.

In one or more implementations of the present disclosure, the AFD 40 can take other actions as part of aborting the disbursement request or in response to aborting the disbursement request. For example, the ATM 10 can cease operations. In another example, the AFD 40 can transmit, such as at 64, a message to the computing device 12 that the cassettes 44 are empty. The computing device 12 can control the display 14 to display this message. It is noted that the cassettes 44 are not, in fact, empty. Displaying the message on the display 14 may deter further attempts to extract banknotes from the ATM 10. Also, in response to aborting the disbursement request, the computing device 12 can communicate an error message or alert over the network 36 to the computing device 50 in order for a service technician to make an onsite visit to the ATM 10 to perform maintenance. Thus, in one or more embodiments of the present disclosure, the ATM 10 can go offline when the first and second predetermined values have been met or exceeded. Proceeding from 64, the process ends at 66.

If, at 58, the stack size is less than the first predetermined value, the AFD 40 decrements the current value of the count at 70 and executes the command at 68. The process then ends at 66. It is noted that 58 is optional and not required in all embodiments of the present disclosure.

It is noted that, in one or more embodiments of the present disclosure, the first and second predetermined values can be changed as desired. The values can be raised or lowered. For both exemplary predetermined values, raising the values generally corresponds to reducing the sensitivity to fraudulent activity. Lowering the exemplary values has the opposite effect, increasing the sensitivity to fraudulent activity. In one or more embodiments of the present disclosure, the AFD 40 and ATM 10 can be configured such that only an onsite technician can raise the values, while values can only be lowered remotely, such as by the computing device 50. In such an embodiment, the computing device 50 can immediately lower the values in response to one or more indications of fraudulent activity at the ATM 10. The computing device 50 can also schedule a future, onsite visit by a technician to raise the values.

It is noted that, in one or more embodiments of the present disclosure, the first and second predetermined values can be changed based on algorithms applying various data. The data can be accumulated during operation of the ATM 10 or the operation of more than one ATM. The data can be applied just prior to execution of 58 and/or 62 so that the first and/or second predetermined value is predetermined "just in time."

For example, the history of disbursements at the ATM 10 can indicate that relatively large stack sizes are withdrawn relatively frequently by bank customers during one or more particular times of the year. By way of example and not limitation, relatively large disbursements may occur during the Summer and/or during holidays. The AFD 40 can be programmed such that, during such periods of the year, defined by one or more calendar dates, one or both of the first and second predetermined values is changed to permit more disbursements of relatively large stack sizes.

As set forth above, when the first and second predetermined values are met or exceeded in the exemplary embodiment, the response of the ATM 10 can be to abort the current disbursement request. In addition to aborting the current disbursement request, the AFD 40 could change its operating speed when the first and second predetermined values are met or exceeded. For example, the AFD 40 could direct banknotes out of the slot 28 at a slower speed. Further, the AFD 40 can establish an internal timer subroutine and require the timer to expire between disbursements. The time period for such a "delay" timer can start when a disbursement command is received and can end after the predetermined time period of the timer. By way of example and not limitation, the AFD 40 can require the expiration of two minutes between the completion of a first disbursement and the start of a second, subsequent disbursement. Generally, perpetrators of fraudulent activity are deterred by delays.

In addition or alternatively, the AFD 40 could set a maximum number for banknotes disbursed during transactions subsequent to a transaction that results in the first and second predetermined values being met or exceeded. For example, the commuting device 12 could control the display 14 to advise users of the ATM 10 that only five banknotes can be disbursed in a single transaction and the AFD 40 can adhere to this limit. This would also result in delays that tend to inhibit fraudulent activity.

After the operation of the ATM 10 has changed in response to one or both of the first and second predetermined values being met or exceeded, the ATM 10 can be serviced directly (onsite by a technician) in order resume normal operation.

Referring again to FIG. 1, the exemplary ATM 10 also includes an alarm card 72. The exemplary alarm card 72 is interconnected with and part of the AFD 40 in the exemplary implementation of the present disclosure. The alarm card 72 can include one or more processors and a transceiver. The alarm card 72 can monitor the activity of the AFD 40. The alarm card 72 can execute the processes detailed above and illustrated in the simplified flow diagram of FIG. 3. Specifically, the alarm card 72 can generate an alarm if a frequency of disbursements of a predetermined stack size exceeds a predetermined value (such as generating an alarm when more than four consecutive stack sizes of ten are disbursed). Further, the alarm card 72 can be configured to exercise control over the AFD 40 if an alarm is triggered. For example, the alarm card 72 can be configured to take the AFD 40 offline if the frequency of disbursements of the predetermined stack size exceeds the predetermined value.

It is noted that in one or more embodiments of the present disclosure, the alarm card 72 can communicate with other sensors and emit an alarm in response to data received from such sensors. In a first example, a temperature sensor can be positioned with the ATM 10, or more particularly within the safe 42, to detect when a torch is being used to destructively open the ATM 10. The temperature sensor can communicate temperature data to the alarm card 72 and the alarm card 72 can transmit an alarm to the server computing device 76 in response to the temperature data. In a second example, a seismic or disturbance sensor can be positioned with the ATM 10 to detect when a drill or prybar is being used to destructively open the ATM 10. Such a sensor could be a motion or vibration sensor positioned in the ATM. A Z20 disturbance sensor by Gallagher Security (security.gallagher.com) could be utilized. The sensor would communicate motion data to the alarm card 72 and the alarm card 72 would transmit an alarm over the second network 74 to the server computing device 76 in response to receiving the motion data. Other kinds of sensors can be used as well, such as sensor configured to detect when a door of the ATM 10 or safe 42 is opened. Such a sensor could sense rotation of a pin on which a door is mounted or be a proximity sensor positioned proximate to the door when the door is closed. The door could be a door to the safe 42 of the ATM 10 or a front-facing fascia of the ATM 10. The alarm card 72 can transmit an alarm to the server computing device 72 in response to such movement data. Further, a combination of more than one kind of sensor can be applied in one or more embodiments of the present disclosure.

Referring again to FIGS. 1 and 2, the alarm card 72 can communicate an alarm to remote computing devices over an alarm network 74 that is at least partially distinct from the network 36. The network 74 can be completely distinct (no portions of overlap) from the network 36. The alarm message can be directed to the alarm network directly by the alarm card 72. The alarm message can be directed over the alarm network 74 to an alarm server 76. The alarm server 76 can be configured to monitor a plurality of ATMs, from various financial institutions, and communicate an alarm message to different parties, such as the financial institution operating the ATM, the manufacturer of the ATM, and local law enforcement. In one or more implementations of the present disclosure, the alarm card 72 can direct the alarm message across both networks 36 and 74. The alarm message can be directed over the network 36 to be received by the server 50 of the financial institution operating the ATM 10.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or subcombinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A method performed by an automated transaction machine (ATM) comprising:
   maintaining, with the ATM, a count of disbursement commands received by the ATM that requires the ATM to dispense a stack size of banknotes greater than or equal to a first predetermined amount;
   comparing, with the ATM, the count to a second predetermined amount;
   aborting, with the ATM, a first disbursement command requiring a stack size of banknotes to be dispensed by the ATM that is greater than or equal to the first predetermined amount in response to said comparing when the count is greater than or equal to the second predetermined amount; and
   receiving, with the ATM, a second disbursement command requiring a stack size of banknotes less than the first predetermined amount; and
   decrementing, with the ATM, the count in response to said receiving the second disbursement command.

2. A method performed by an automated transaction machine (ATM) comprising:
- maintaining, with the ATM, a count of disbursement commands received by the ATM that requires the ATM to dispense a stack size of banknotes greater than or equal to a first predetermined amount;
- comparing, with the ATM, the count to a second predetermined amount;
- aborting, with the ATM, a first disbursement command requiring a stack size of banknotes to be dispensed by the ATM that is greater than or equal to the first predetermined amount in response to said comparing when the count is greater than or equal to the second predetermined amount; and
- decreasing, with the ATM, a speed of moving banknotes out of the ATM in response to disbursement commands received after the first disbursement command, said decreasing in response to said aborting.

3. A method performed by an automated transaction machine (ATM) comprising:
- maintaining, with the ATM, a count of disbursement commands received by the ATM that requires the ATM to dispense a stack size of banknotes greater than or equal to a first predetermined amount;
- comparing, with the ATM, the count to a second predetermined amount;
- aborting, with the ATM, a first disbursement command requiring a stack size of banknotes to be dispensed by the ATM that is greater than or equal to the first predetermined amount in response to said comparing when the count is greater than or equal to the second predetermined amount; and
- limiting, with the ATM, every disbursement after the first disbursement command to a third predetermined amount that is less than the first predetermined amount, said limiting in response to said aborting.

4. A method performed by an automated transaction machine (ATM) comprising:
- maintaining, with the ATM, a count of disbursement commands received by the ATM that requires the ATM to dispense a stack size of banknotes greater than or equal to a first predetermined amount;
- comparing, with the ATM, the count to a second predetermined amount;
- aborting, with the ATM, a first disbursement command requiring a stack size of banknotes to be dispensed by the ATM that is greater than or equal to the first predetermined amount in response to said comparing when the count is greater than or equal to the second predetermined amount;
- receiving, at a primary controller of the ATM, a transaction request from a user of the ATM;
- transmitting, with a transceiver of the ATM, over a first network, details of the transaction request to a first server computing device that is remote from the ATM for approval of the transaction request;
- receiving, at the primary controller of the ATM, approval of the transaction request from the first server computing device;
- directing, from the primary controller of the ATM, in response to said receiving approval of the transaction request, a second disbursement command to an advanced function dispenser (AFD) of the ATM, the AFD and the primary controller being distinct and physically spaced components of the ATM;
- dispensing, with the AFD of the ATM, banknotes in response to the second disbursement command;
- receiving, at the AFD of the ATM, the first disbursement command; and
- wherein:
  - said maintaining is further defined as maintaining, with the AFD, the count of disbursement commands requiring a stack size greater than or equal to the first predetermined amount;
  - said comparing is further defined as comparing, with the AFD of the ATM, the count to a second predetermined amount; and
  - said aborting is further defined as aborting, with the AFD of the ATM, the first disbursement command requiring the stack size greater than or equal to the first predetermined amount in response to said comparing when the count is greater than or equal to the second predetermined amount.

5. The method of claim 4 wherein said aborting is further defined as:
- aborting, with the AFD of the ATM, without regard to commands received from outside of the AFD of the ATM, the first disbursement command requiring the stack size greater than or equal to the first predetermined amount in response to said comparing when the count is greater than or equal to the second predetermined amount.

* * * * *